Aug. 11, 1931.  W. E. NOBBE  1,818,152
PROCESS AND APPARATUS FOR FORMING SHEET GLASS
Filed Jan. 19, 1928   2 Sheets-Sheet 2
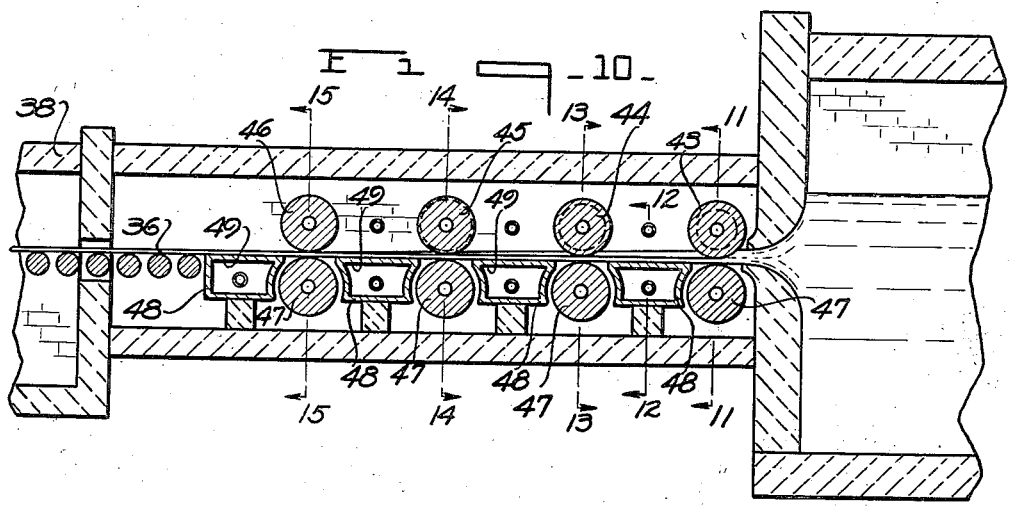
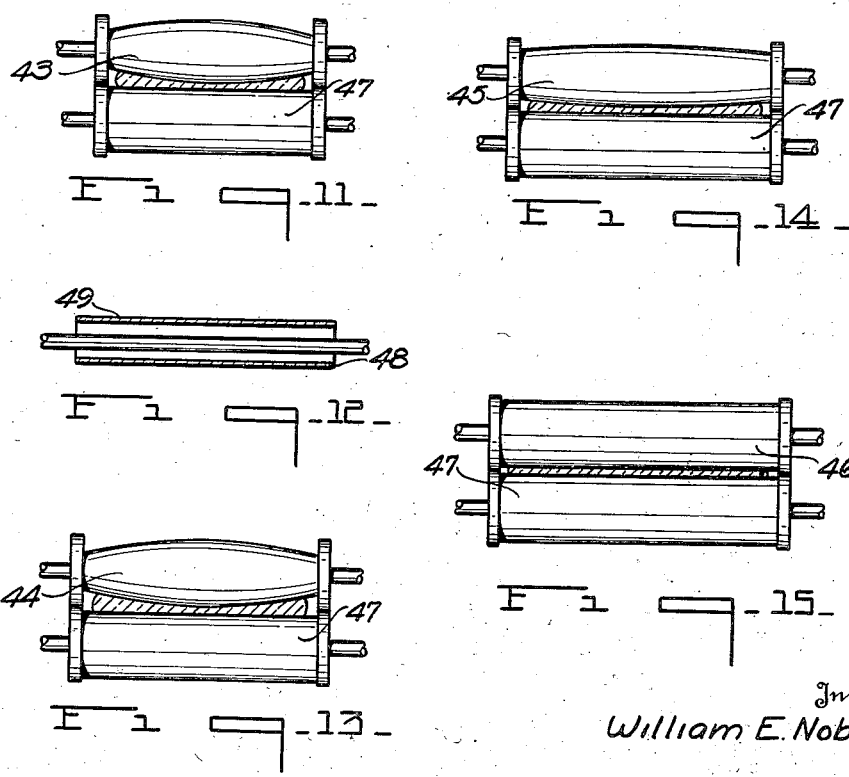
Inventor
William E. Nobbe
By Frank Fraser
Attorney Patented Aug. 11, 1931

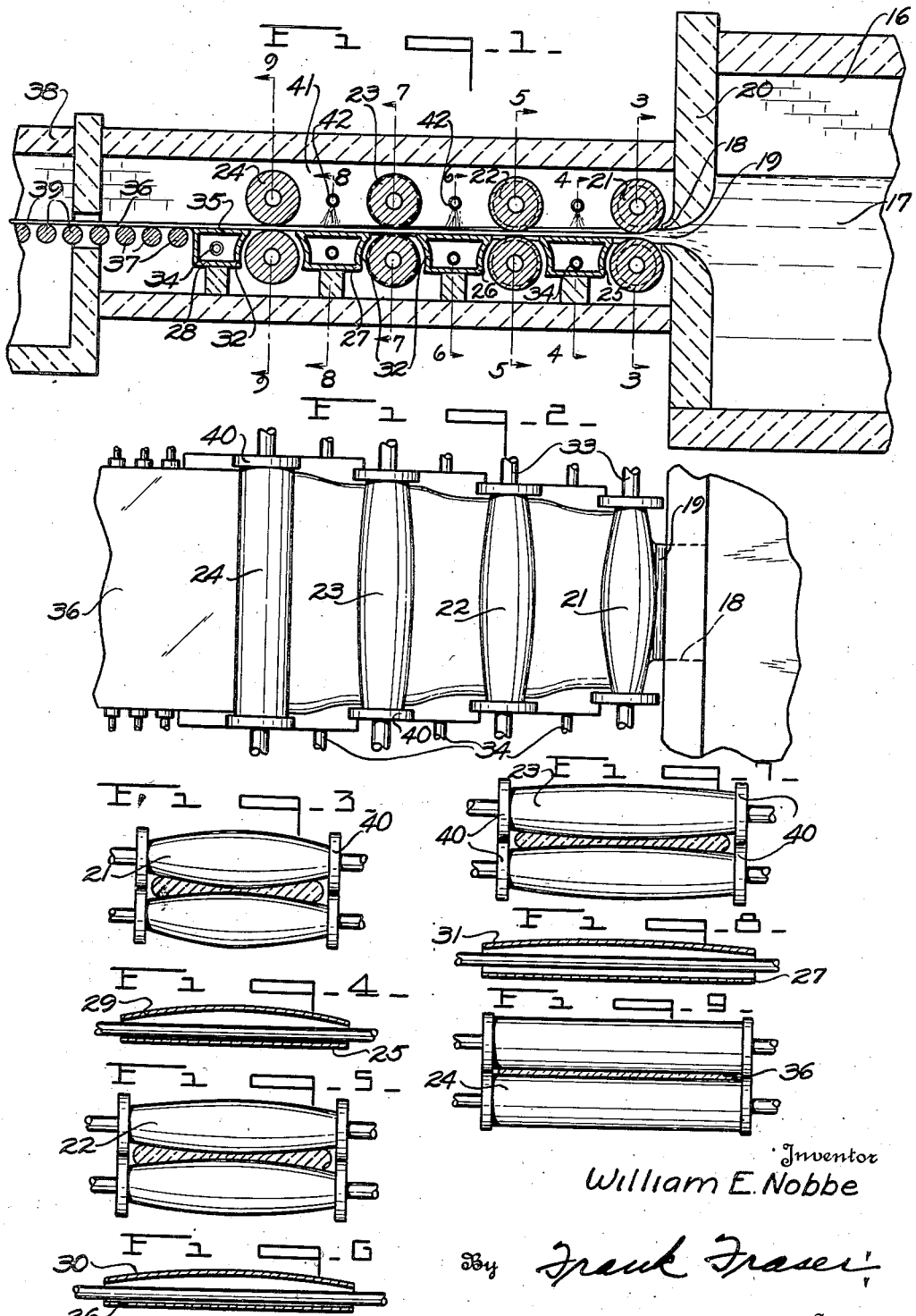

1,818,152

UNITED STATES PATENT OFFICE

WILLIAM E. NOBBE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET GLASS

Application filed January 19, 1928. Serial No. 247,855.

The present invention relates to a process and apparatus for forming sheet glass.

The glass sheets produced in accordance with this invention are especially well adapted for use as plate glass blanks but obviously they are not necessarily restricted to such use.

One of the objects of this invention is to provide a process and apparatus of this character whereby sheet glass may be quickly and easily formed and sheets which are exceptionally flat and of substantially predetermined dimensions obtained.

Another object of this invention is to provide a process and apparatus of this nature wherein a stream of molten glass is directed in a substantially horizontal path and gradually reduced through successive stages to a sheet of substantially predetermined dimensions.

Still another object of this invention is to provide such a process and apparatus wherein the molten glass is first created in a furnace and then directed in a substantially horizontal path and reduced to a sheet of substantially predetermined dimensions by spreading it outwardly from its center.

A still further object of this invention is to provide a process and apparatus wherein a stream of molten glass is flowed from a source of molten glass and passed in a substantially horizontal plane between a plurality of pairs or sets of forming members which serve to gradually reduce the stream to a sheet of substantially predetermined thickness and width, the apparatus preferably including means for driving the forming members at respectively increasing speeds to maintain proper longitudinal tension in the sheet being formed.

Still another object of the invention is to provide a process and apparatus of this character wherein a stream of molten glass is flowed from a furnace in a substantially horizontal path and passed between a plurality of spaced pairs or sets of forming members or rolls which serve to gradually reduce the stream to sheet form together with means arranged between the pairs or sets of forming members for supporting the sheet and preventing the same from sagging.

Various other objects, advantages and novel details of construction of the present invention will be made more apparent as this description proceeds, especially when considered in connection with the accompanying drawings wherein:

Figure 1 is a fragmentary vertical longitudinal sectional view through an improved sheet forming apparatus constructed in accordance with this invention.

Figure 2 is a top plan view of the sheet forming means illustrated in Figure 1.

Figures 3 to 9 inclusive are fragmentary vertical sectional views taken substantially on the planes indicated by lines 3—3, 4—4, 5—5, 6—6, 7—7, 8—8, and 9—9 of Figure 1 showing the various pairs of sheet forming rolls and the sheet supporting means located therebetween.

Figure 10 is a fragmentary vertical longitudinal sectional view through a modified form of sheet forming apparatus, and Figures 11 to 15 inclusive are detail vertical sectional views taken substantially on the planes indicated by lines 11—11, 12—12, 13—13, 14—14, and 15—15 in Figure 10 showing the construction of the various pairs of sheet forming rolls and of the sheet supporting means located therebetween.

Referring now more particularly to Figures 1 to 9 of the drawings it will be noted that there is fragmentarily illustrated one end of a furnace or other suitable container 16 wherein is produced a mass of molten glass 17. The furnace is provided in one wall thereof with an outlet opening or spout 18 through which the molten glass is adapted to flow in a relatively thick narrow stream 19. The outlet opening 18 is preferably arranged in the wall 20 of the furnace somewhat below the normal level of the mass of molten glass therein and is relatively narrow as seen more particularly from an examination of Figure 2 so that the relatively thick narrow stream 19 will be caused to flow therefrom under the head pressure of the mass of molten glass 17.

The stream of molten glass 19 which issues or flows from the outlet spout 18 is arranged in a substantially horizontal plane and in accordance with this invention the stream is directed in a substantially horizontal path during the time it is reduced to sheet form. For reducing the stream of molten glass to sheet form and for directing it in a substantially horizontal path there is provided a plurality of pairs or sets of forming rolls 21, 22, 23 and 24 arranged in substantially horizontal alignment with one another with the rolls of each pair being spaced apart to permit the glass to pass therebetween.

The several pairs of rolls are of respectively increasing length from the rolls 21 arranged nearest the furnace to the rolls 24 located most remote therefrom. The rolls 21, 22 and 23 gradually taper from their centers towards their ends while the most remote rolls 24 are cylindrical to form a straight sheet forming pass having parallel sides.

The degree of taper of the several sets of rolls gradually decreased from the foremost rolls 21 to the most remote pair so that the rolls gradually approach cylindrical form. The cylindrical rolls 24 are arranged relatively close together, the space therebetween determining the thickness of the sheet produced.

Due to the particular construction of the forming rolls the space between the rolls of each succeeding pair is less than the space of the rolls of the preceding pair so that the stream of molten glass which is directed therebetween is gradually reduced in thickness. Furthermore, by reason of the formation of the rolls, the glass is spread outwardly from the center towards the opposite ends thereof, and thus the stream while being gradually reduced in thickness is simultaneously increased in width so that the resulting sheet will be of substantially predetermined dimensions.

Located between adjacent pairs of rolls 21, 22, 23 and 24 are supporting tables or members 25, 26 and 27 respectively and located adjacent to but beyond the most remote pair of rolls 24 is a supporting table or member 28. The top or upper faces or surfaces 29, 30 and 31 of the tables 25, 26 and 27 respectively are curved or shaped to conform to the longitudinal contour of the lowermost rolls which immediately precedes the respective table. As shown particularly in Figure 1 these tables or supporting members are positioned between the adjacent pairs of rolls and beneath the stream or sheet so as to support the sheet or stream during its formative period and prevent the same from sagging.

As shown the longitudinal sides 32 of these supporting tables may be curved or shaped to substantially conform to the circumference of the rolls so that the upper surfaces of these supporting tables may be made relatively wide to substantially fill the space between the pairs of rolls.

The temperature of the several pairs of rolls may be controlled by passing a temperature control medium through the hollow shafts 33 thereof and the temperature of the supporting tables 25, 26, 27 and 28 may be controlled by circulating a temperature control medium therethrough by means of pipes or conduits 34. The upper surface 35 of supporting table 28 will be substantially flat so as to properly support the sheet as it leaves the pair of forming rolls 24.

The flow of the relatively thick narrow stream of molten glass issuing from the outlet opening or spout 18 is controlled or regulated by the adjacent pair of rolls 21 but obviously the amount of glass flowing from the furnace may be controlled by an adjustable gate or closure member (not shown) if desired.

The stream of molten glass after flowing from outlet spout 18 passes between the several pairs of rolls whereby it is reduced through successive stages to a sheet of substantially predetermined dimensions, each succeeding pair of rolls serving to decrease the thickness of the stream while simultaneously increasing its width as clearly illustrated in Figures 2 to 9 inclusive. In other words, there is first created a mass of molten glass which is subsequently reduced through successive stages to a sheet of substantially predetermined dimensions by spreading it outwardly from its center.

The formed sheet 36 after passing over supporting table 28 is carried upon a plurality of rolls or other suitable conveying means 37 into an annealing lehr 38 wherein it is supported and carried along on a plurality of horizontally arranged supporting rolls 39.

Each of the rolls of the several pairs of rolls is also preferably provided at its opposite ends with collars 40 which serve to prevent the molten glass from flowing outwardly beyond the ends of the rolls. The several pairs of rolls as well as the supporting tables are preferably located within a chamber or compartment 41 and the temperature of this compartment as well as the temperature of the glass as it passes between the rolls can be controlled by burners or other suitable heating means 42 to thus maintain the glass in a plastic workable condition. The several pairs of forming rolls may, if desired, be driven (by means not shown) at progressively increasing speeds to maintain the sheet under longitudinal tension.

In Figures 10 to 15 a modified form of construction is illustrated. In this form the upper and lower rolls of each pair of rolls are of different longitudinal contour, the upper rolls 43, 44, 45 and 46 of the several pairs of rolls are similar in shape and contour to the upper rolls of the pairs of rolls 21, 22, 23 and 24 of the previously described construction. However the lower rolls 47 of each pair of rolls are cylindrical so that the bottom of the sheet forming pass created by each pair of rolls is straight or in other words parallel with the axis of rotation of the rolls.

Located between the pairs of rolls and beyond the most remote pair of rolls are supporting members or tables 48, the upper surfaces 49 of which are flat. These flat surfaces 49 of the supporting tables 48 engage the lower surface of the sheet during the formative period to support the same between the several pairs of forming rolls and immediately after the sheet leaves the final pair of forming rolls. Both the forming rolls and the supporting tables may have the temperature thereof controlled by circulating therethrough a temperature control medium in the same manner as described in the previously referred to form of construction.

As in the previously described form of construction the relatively thick narrow stream of molten glass is reduced through successive stages to form a sheet of substantially predetermined dimensions. The present form differs from the previously described form, however, in that the mass of glass or the sheet during the formative period is spread from its center outwardly to its opposite ends only by the upper rolls, the bottom of the mass or sheet remaining flat or parallel with the axis of rotation of the lowermost rolls. However, the effect is the same as the sheet is gradually reduced in thickness and simultaneously increased in width so that the resulting sheet will be of substantially predetermined dimensions.

While an embodiment of the invention has been described and illustrated herein somewhat in detail it will be readily apparent to those skilled in this art that various changes, modifications and rearrangements may be resorted to without departing from the spirit and scope of this invention and to this end reservation is made to make such changes as may come within the purview of the accompanying claims.

I claim:

1. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, said rolls being constructed to reduce the thickness of the stream first at its center and to then subsequently reduce the end portions to the same thickness, and means for supporting the stream of glass between adjacent pairs of forming rolls to prevent sagging of the thinner portions of the stream with respect to the thicker portions thereof.

2. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, said rolls being constructed to reduce the thickness of the stream first at its center, and to then gradually reduce the end portions through successive stages to the same thickness by spreading the glass outwardly from its center, and means for supporting the stream of glass between adjacent pairs of forming rolls to prevent the central thinner portion of the stream from sagging relative to the thicker end portions.

3. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, the rolls of the first pair adjacent the furnace tapering from their centers toward their opposite ends, and the last pair of rolls remote from the furnace being substantially cylindrical, and means for supporting the stream of glass between adjacent pairs of forming rolls to prevent sagging of the thinner portions of the stream with respect to the thicker portions thereof.

4. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, the rolls of the first pair adjacent the furnace tapering from their centers toward their opposite ends with the succeeding pairs of rolls gradually approaching cylindrical form, and means for supporting the stream of glass between adjacent pairs of forming rolls to prevent the central thinner portion of the stream from sagging relative to the thicker end portions.

5. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, the rolls of the first pair adjacent the furnace tapering from their centers toward their opposite ends, and the last pair of rolls remote from the furnace being substantially cylindrical, and glass supporting tables in advance of each pair of rolls for receiving the glass therefrom, the upper surface of each table being shaped to conform to the longitudinal contour of the lower roll of the preceding pair of rolls.

6. In sheet glass forming apparatus, the combination with a furnace containing a mass of molten glass and provided with an outlet through which a stream of molten glass issues, of means for directing the stream in a substantially horizontal path and reducing the same through successive stages to sheet form, including a plurality of pairs of sheet forming rolls, the rolls of the first pair adjacent the furnace tapering from their centers toward their opposite ends with the succeeding pairs of rolls gradually approaching cylindrical form, and a plurality of glass supporting tables between adjacent pairs of rolls for receiving the glass therefrom, the upper surfaces of said tables being shaped to conform to the longitudinal contour of the lower roll of the preceding pair of rolls.

7. The process of forming sheet glass, which consists in advancing a stream of molten glass in a generally horizontal direction, reducing the thickness of the stream first at its center, in then reducing the end portions of said stream to the same thickness and in preventing sagging of the thinner portion of the stream relative to the thicker portions during the reduction of said stream to sheet form.

8. The process of forming sheet glass, which consists in advancing a stream of molten glass in a generally horizontal direction, reducing the thickness of the stream first at its center, in then spreading the glass through successive stages from the center outwardly to gradually reduce the end portions of said stream to the same thickness as the center and in preventing sagging of the central thinner portion of the stream relative to the thicker end portions thereof during the reduction of said stream to sheet form.

Signed at Toledo, in the county of Lucas and State of Ohio, this 16th day of January, 1928.

WILLIAM E. NOBBE.